(12) United States Patent
Voss

(10) Patent No.: US 11,602,976 B2
(45) Date of Patent: Mar. 14, 2023

(54) AIR VENT

(71) Applicant: Rock Solid Industries International (Pty) Ltd, Pietermaritzburgh (ZA)

(72) Inventor: Michael Voss, Pinetown (ZA)

(73) Assignee: ROCK SOLID INDUSTRIES INTERNATIONAL (PTY) LTD, Pietermaritzburgh (ZA)

( * ) Notice: Subject to any disclaimer, the term of this patent is extended or adjusted under 35 U.S.C. 154(b) by 335 days.

(21) Appl. No.: 16/906,399

(22) Filed: Jun. 19, 2020

(65) Prior Publication Data

US 2020/0398644 A1    Dec. 24, 2020

(30) Foreign Application Priority Data

Jun. 21, 2019    (ZA) ................................ 2019/04021

(51) Int. Cl.
*B60H 1/26* (2006.01)
*B62D 33/04* (2006.01)
*B60H 3/06* (2006.01)

(52) U.S. Cl.
CPC ........... *B60H 1/262* (2013.01); *B60H 3/0641* (2013.01); *B62D 33/04* (2013.01)

(58) Field of Classification Search
CPC ...... B60H 1/262; B60H 1/248; B60H 3/0641; B62D 33/04

USPC ................. 454/162–163, 136–137, 116, 39; 292/212

See application file for complete search history.

(56) References Cited

U.S. PATENT DOCUMENTS

| | | | | |
|---|---|---|---|---|
| 1,181,866 A | * | 5/1916 | Forrester | B61D 27/009 454/116 |
| 2010/0170398 A1 | * | 7/2010 | Bercich | B60H 1/00364 96/140 |

FOREIGN PATENT DOCUMENTS

WO    WO 2016-042494    3/2016

* cited by examiner

*Primary Examiner* — Vivek K Shirsat
(74) *Attorney, Agent, or Firm* — Nolan R. Hubbard; K&L Gates LLP

(57) ABSTRACT

An air vent for a vehicle or vehicle canopy includes an external and an internal duct. The external duct has an inlet and an outlet. The height of the outlet is less than that of the inlet. The inlet and the outlet are arranged such that, in use, an uppermost point of the inlet is located above an uppermost point of the outlet. The internal duct is in fluid communication with the external duct via one or more openings arranged in the internal duct or at a junction between the internal duct and the external duct. The internal duct is configured to be in fluid communication with an interior of the vehicle via a slot defined by the vehicle. The or each opening is arranged such that, in use, the uppermost point of the outlet of the external duct is located below a lowermost point of the or each opening.

35 Claims, 7 Drawing Sheets

AIR VENT

FIELD OF THE INVENTION

The invention relates, generally, to air ventilation and filtration for vehicles. More particularly, the invention relates to an air vent for a vehicle or for a vehicle canopy.

BACKGROUND TO THE INVENTION

For purposes of interpreting this specification, the term "canopy" or "vehicle canopy" refers to a cover for a load bin of a vehicle such as a "bakkie", as they are generally known in South Africa, or a utility vehicle or pick-up truck, as they are generally known elsewhere in the world.

An increase in altitude results in an atmospheric pressure drop. Changes in temperature may also result in changes in the atmospheric pressure. Small spaces or gaps in a canopy itself and/or between the canopy and a load bin of a vehicle (to which the canopy is mounted) allow for the passage of air between an interior of the canopy and the external environment. In use, dust and other particles enter into the canopy through the spaces and/or gaps described above at least partly due to the interior pressure in the canopy being lower than the air pressure in the external environment. The entry of dust and/or other particles into a canopy whilst driving is unwanted as it dirties the inside of the canopy and contents held therein.

Air vents that are attachable to or integrated into canopies are known in the art. One such known air vent is commonly referred to as a "Muller vent". An example of the Muller vent 10 is conceptually illustrated in FIG. 1. The Muller vent 10 is designed to be fitted to a roof of a canopy, caravan and/or trailer. It may be configured such that, when attached to a canopy, typically in a rear region of its roof, it draws air out from the inside of the canopy through an internal duct 12 (see the arrows 14 in FIG. 1 which show the direction of air flow from the inside of the canopy). An air outlet 13 operatively located at a rear of the vent 10 allows the air 14 drawn out from the inside of the canopy as well as external air passing through an external duct 16 of the vent 10 from the outside (see the arrows 18 in FIG. 1 which show the direction of air flow outside of the canopy) to pass out of the vent 10. The internal duct 12 is thus configured to allow the passage of air from the inside of the canopy out via the outlet 13.

The Applicant has found that the Muller vent is not sufficiently effective as, at least in some instances, significant amounts of dust and/or other particles may still enter the inside of the canopy.

The Muller vent itself is generally small relative to the width of the canopy or cab to which it is attached and the outlet is thus also relatively small. This limits the amount of air that can be extracted from the inside of the canopy. Furthermore, the size of the outlet, and particularly its height, is large relative to the size of the vent as a whole. In wet conditions, the significant height of the outlet may be disadvantageous as it may cause water to flow in and potentially enter the canopy. In addition, the Applicant has found that the slope of the lip beneath the outlet and the location and angle of the openings employed in the Muller vent are not conducive to preventing water from entering the vent via its front and/or rear. This is a major disadvantage, especially when a vehicle fitted with the Muller vent is used during heavy rains.

Some other known air vents may be located at a front region of the canopy. The air flow at the front region of the canopy may be less rapid than the air flow at a central or rear region of the canopy. Air vents generally perform better when air flows at a relatively high speed and this is therefore, at least in some cases, not a desirable or preferred air vent arrangement.

The Applicant thus identified a need for an air vent for a vehicle, caravan, trailer, or the like, and specifically for a canopy of a vehicle, which addresses at least some of the issues identified above.

More specifically, there is a need for an air vent that is capable of improving air flow and ventilation of the canopy or cab and/or more effectively preventing or minimising the ingress of dust and water.

SUMMARY OF THE INVENTION

According to a first aspect of the invention, there is provided an air vent for a vehicle or vehicle canopy, the air vent comprising:

an external duct having an inlet and an outlet, the height of the outlet being less than the height of the inlet, wherein the inlet and the outlet are arranged such that, in use, an uppermost point of the inlet is located above an uppermost point of the outlet; and an internal duct in fluid communication with the external duct via one or more openings arranged in the internal duct or at a junction between the internal duct and the external duct, wherein the internal duct is configured to be in fluid communication with an interior of the vehicle via a slot defined by the vehicle, and wherein the or each opening is arranged such that, in use, the uppermost point of the outlet of the external duct is located below a lowermost point of the or each opening.

The vehicle may be any suitable vehicle, such as a motor vehicle (e.g. a bakkie), a caravan and/or a trailer.

The air vent may be configured to be mounted to a vehicle canopy or may be integral with the canopy of the vehicle, to provide ventilation and/or filtration functionality.

The air vent may have an elongate shape, with the inlet being a slit orientated/configured to face a front of the canopy or vehicle and the outlet being a slit orientated/configured to face a rear of the canopy or vehicle. The vent may operatively be located in or near a rear zone of a roof of the canopy or vehicle. The inlet and outlet extend along the length of the air vent.

The air vent may include a first sheet of material and a second sheet of material which are secured to each other. The first sheet may be an operatively lower part of the vent and the second sheet may be an operatively upper part of the vent. The sheets may be shaped (e.g. bent and/or folded) and may be arranged so as to define the external duct and the internal duct. The external duct may be defined by an upper surface forming part of the second sheet of material, an intermediate surface forming part of the first sheet of material, and opposing end zones or walls of the air vent. The internal duct may be defined by a lower surface forming part of the first sheet of material and by the opposing end zones/walls of the air vent.

The first sheet may define or be shaped to include an overhang which defines part of the external duct and which operatively shelters or covers the one or more openings. The overhang may operatively substantially prevent the ingress of water through the one or more openings.

The one or more openings may be located at a junction between the internal and external ducts. The opening(s) may be configured to permit ventilation of the interior of the canopy. In some embodiments, the vent may include a plurality of openings in the first sheet, the openings being longitudinally spaced apart along the length of the vent.

The opening(s) may be located on an operatively upper zone of a sloped portion of the first sheet. The sloped portion may be connected to or may form part of the overhang, with the overhang extending beyond a top of the sloped portion.

The internal duct may have a first end and a second end, with the opening(s) being located at the first end and the second end being configured for fluid communication with an interior of the canopy or vehicle to allow air to flow into and/or out of the interior of the canopy or vehicle.

A filter arrangement may be provided adjacent to the opening(s) substantially to prevent dust and/or water from entering the interior of the canopy. The filter arrangement may be provided below or near the overhang. The filter arrangement may be located between the overhang and a substantially flat base zone of the first sheet.

The opening(s) may each have a height greater than that of the outlet.

The vent may have a generally elongate shape. The vent may be attachable or may extend across a substantial portion of a lateral dimension of the roof of the canopy or vehicle. In some embodiments, the vent operatively extends along at least half the width of the roof to which it is attached or of which it forms a part.

The vent may be attached or attachable to a roof panel of a modular canopy comprising side panels, front and rear panels and the roof panel. The roof panel may be manufactured with a slot therein such that, when the vent is attached to the roof panel of the canopy, the slot provides fluid communication between an interior of the canopy and the internal duct of the vent. The internal duct may thus be configured for fluid communication with the interior of the canopy via the slot in the roof panel. The vent may be manufactured integrally with the roof panel described above.

According to a second aspect of the invention, there is provided a vehicle canopy which includes or has mounted thereto an air vent substantially as described above.

According to a third aspect of the invention, there is provided a kit for a vehicle canopy which includes an air vent substantially as described above.

According to a fourth aspect of the invention, there is provided a vehicle which includes or has mounted thereto an air vent substantially as described above.

BRIEF DESCRIPTION OF THE DRAWINGS

The invention will now be further described, by way of example, with reference to the accompanying drawings.

In the drawings.

DETAILED DESCRIPTION WITH REFERENCE TO THE DRAWINGS

The following description of the invention is provided as an enabling teaching of the invention, is illustrative of the principles of the invention and is not intended to limit the scope of the invention. It will be understood that changes can be made to the embodiments described, while still attaining beneficial results of the present invention. Furthermore, it will be understood that some benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention.

Figure 1:
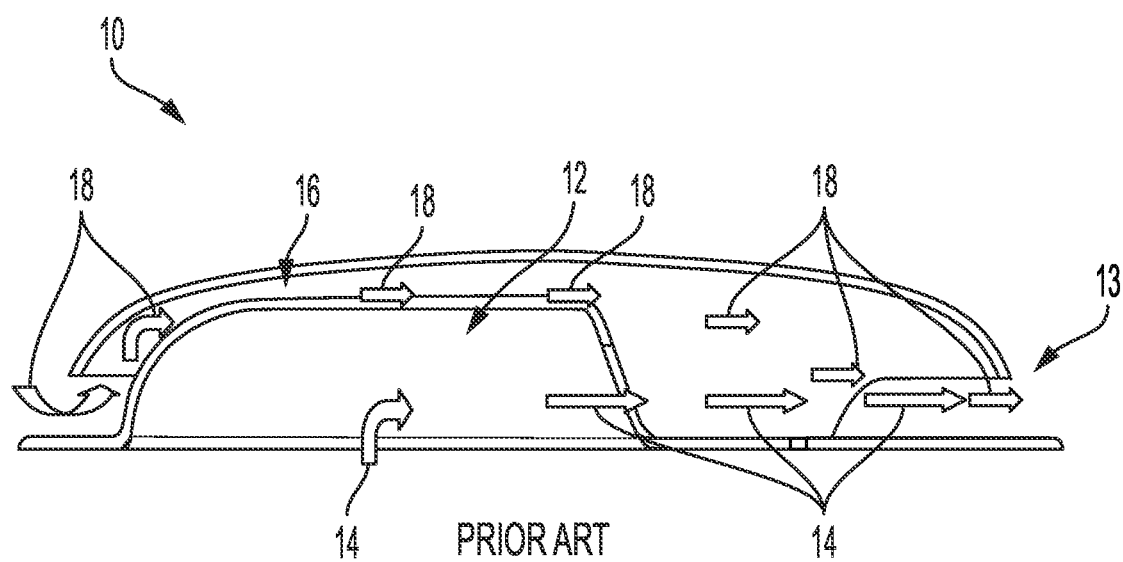
FIG. 1 is a conceptual sectional side view illustrating an example of a known Muller vent design.
Figure 2:
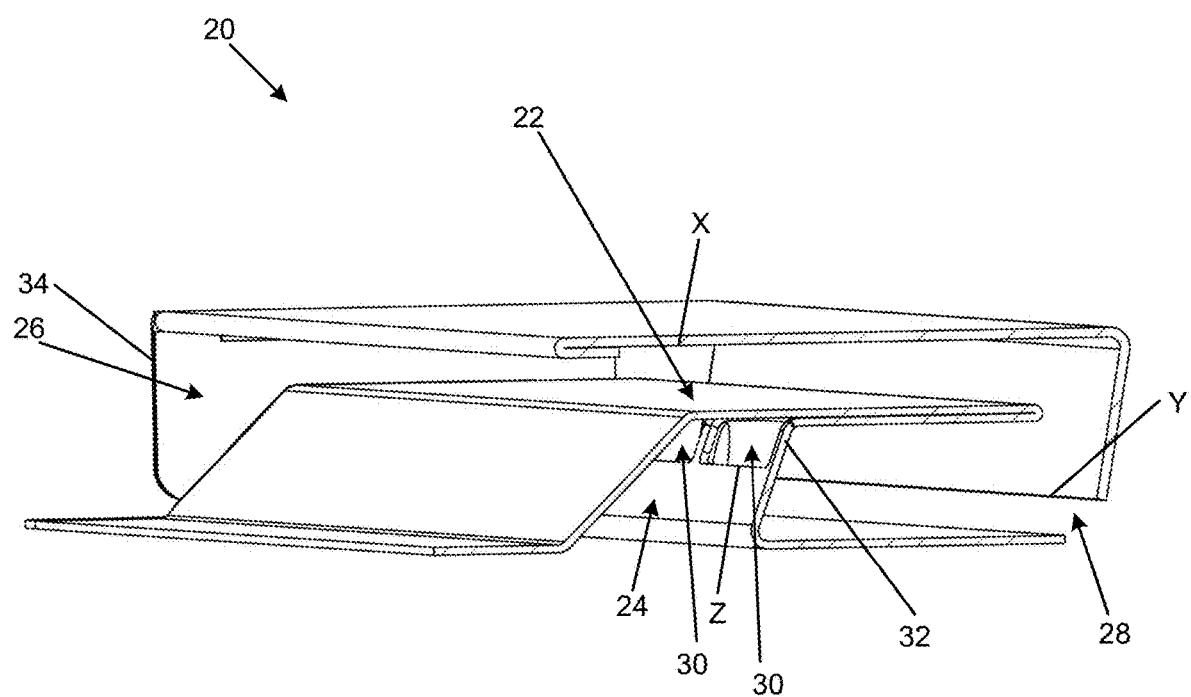
FIG. 2 is a three-dimensional view of part of an embodiment of an air vent for a vehicle, according to the invention.

FIG. 2 provides a basic, conceptual illustration of part of an air vent 20 according to the invention. It will be appreciated that FIG. 2 does not show the complete air vent (only a part of its length and one of its ends 34 is shown) so as better to illustrate certain features thereof, such as the rectangular openings referred to below.

The vent 20 comprises angled and folded sheets of material defining an external duct 22 and an internal duct 24 through which air flows, in use. The external duct 22 has an inlet 26 and an outlet 28. The internal duct 24 is in fluid communication with the external duct 22 via a plurality of substantially rectangular openings 30 arranged in a longitudinally spaced apart manner (two of which are visible in FIG. 2). The openings 30 are located in a wall 32 forming a junction between the ducts 22,24. The wall 32 is defined by one of the sheets and the openings 30 may be formed by making holes in the sheet. The wall 32 is referred to as an "sloped portion" below.

The height of the outlet 28 is less than the height of the inlet 26 and the uppermost point "X" of the inlet 26 is located a significant distance above the uppermost point "Y" of the outlet 28, as marked in FIG. 2. Furthermore, the openings 30 are arranged such that, in use, the vent 20 mounted to or forming part of a vehicle canopy, the uppermost point "Y" of the outlet 28 is located below a lowermost point of each opening 30. In order to illustrate the latter feature, the lowermost point of one of the openings 30 is marked "Z" in FIG. 2.

A more detailed, specific embodiment of the invention will now be described with reference to FIGS. 3 to 10. In FIGS. 3 to 10, reference numeral 40 generally refers to an embodiment of an air vent 40 according to the invention (hereinafter referred to as "the vent 40") and reference numeral 52 generally refers to a non-limiting example of a vehicle canopy to which the vent 40 may be mounted.

The Applicant previously developed a flat pack kit for a canopy. The kit includes a roof panel, side panels and one or more end panels (e.g. a front panel and a rear panel). The kit thus provides a modular canopy. The panels are specifically shaped, dimensioned and configured to be flat packed and assembled and the kit can thus be distributed as a complete knock-down (CKD). The basic concept of the kit is described in Patent Cooperation Treaty (PCT) Patent Application No. PCT/IB2015/057124, published as WO/2016/024494 on 24 Mar. 2016, which is incorporated by reference herein. The air vent 40 of the invention may, for example but not exclusively, be incorporated into such a kit and/or may form part of such a canopy.

Figure 6:
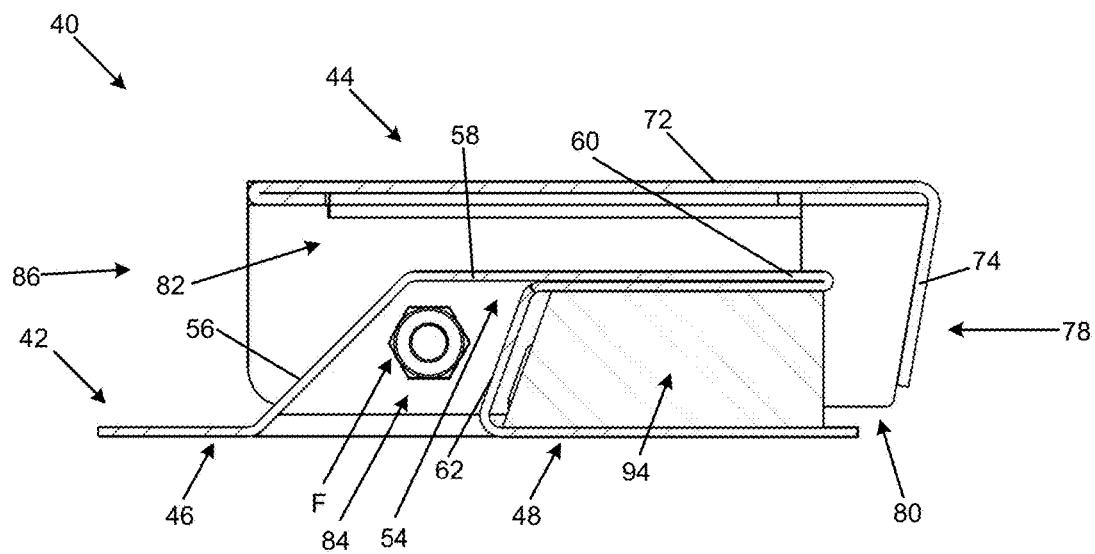
FIG. 6 is a cross-sectional view of the air vent of FIG. 3, taken along the line "A-A" in FIG. 5.

The vent 40 comprises an elongate first sheet 42 of folded steel and an elongate second sheet 44 of folded steel, best shown in FIG. 6 which illustrates both sheets 42, 44 in cross-section.

In basic terms, the sheets 42, 44 are bent/angled and folded and secured to each other so as to define the external duct and the internal duct referred to below using reference numerals 82 and 84 respectively. The external duct 82 is defined by an upper surface forming part of the second sheet 44, an intermediate surface forming part of the first sheet 42, and opposing end zones or walls of the vent 40. The internal duct 84 is defined by a lower surface forming part of the first sheet 42 and by the opposing end zones/walls of the air vent 40.

The first sheet 42 comprises flat base zones 46, 48 which are operatively attached to inner surfaces of a roof panel 50 of the canopy 52. More specifically, the zones 46, 48 may be secured against edges surrounding or adjacent to a slot 38 configured in the roof panel 50 of the canopy 52 (see FIGS. 6 and 10). The vent 40 may be secured to the roof panel 52, e.g. with fasteners such as nuts and bolts, in such a manner that the interior of the canopy 52 is in fluid communication with an internal duct 84 of the vent 40 via the slot 38 (the internal duct 84 in turn providing fluid communication with an external duct 82—the ducts 82, 84 are described in detail below).

The flat base zones 46, 48 flank a central folded zone 54 of the first sheet 42. As shown in FIG. 6, the folded zone 54 comprises a first sloped portion 56, a flat duct portion 58, a folded overhang portion 60 which is formed by folding the steel back on itself, and a second sloped portion 62 which includes openings along the length of thereof. The openings are not illustrated in FIGS. 3 to 10 but may be similar to those illustrated in and described with reference to FIG. 2 above (refer to the openings 30 in FIG. 2).

The second sloped portion 62 is connected to the base zone 48 and the first sloped portion 56 is connected to the base zone 46.

Figure 3:
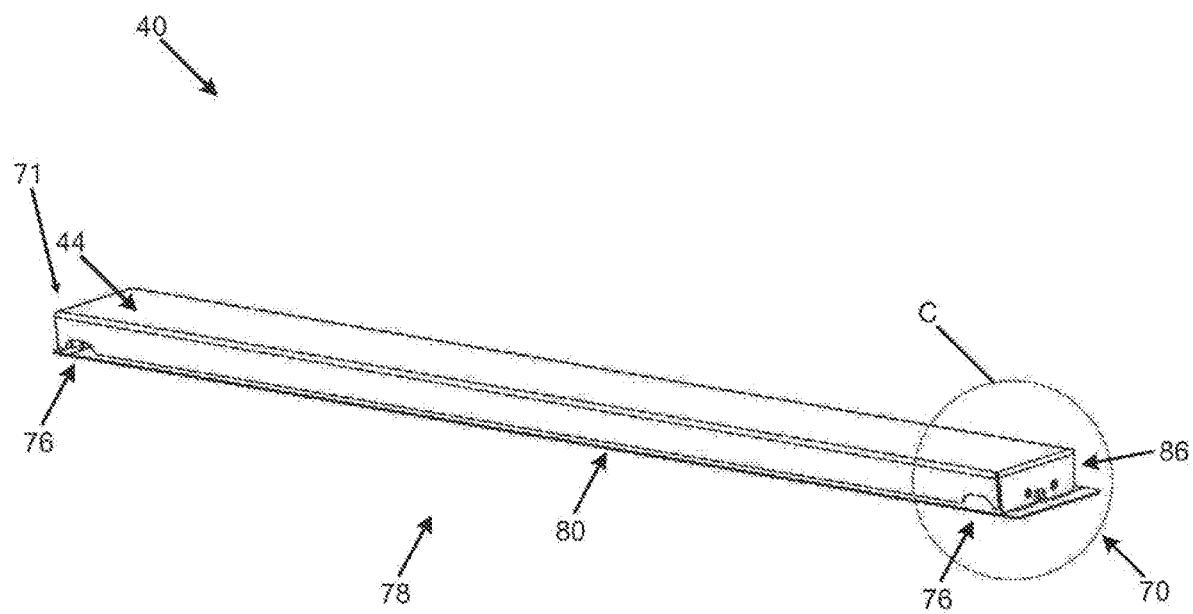
FIG. 3 is a three-dimensional view of an embodiment of an air vent for a vehicle, according to the invention, shown from the top and the rear.
Figure 4:
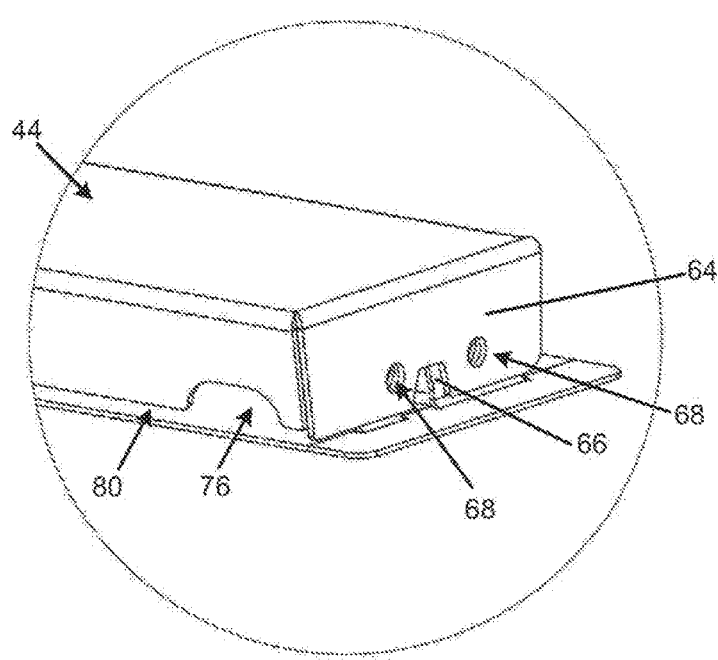
FIG. 4 is an enlarged view of the region "C" in FIG. 3.
Figure 5:
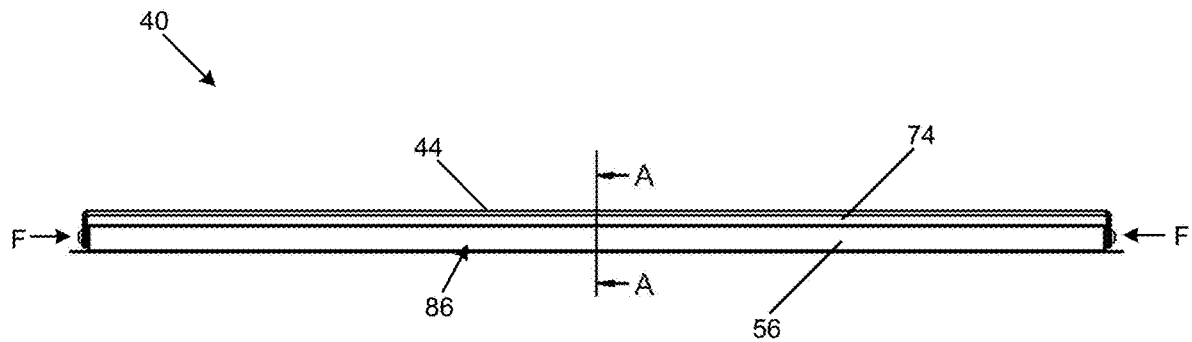
FIG. 5 is a front view of the air vent of FIG. 3.

The first sheet 42 and the second sheet 44 also include end zones or end walls at both ends thereof. These end zones or end walls extend generally vertically in use. The end zones/walls of the first sheet 42 and second sheet 44 are operatively fastened to each other so as to define an assembly, i.e. the vent 40. FIGS. 3 and 4 illustrate the mating arrangement of the end zones 64, 66 of the sheets 42, 44 at one end 70 of the vent 40. The mating arrangement described at one end 70 of the vent 40 can be reproduced at the second end 71 of the vent 40. The zones 64, 66 are each provided with a pair of complementally shaped and located apertures 68 for fastening purposes (e.g. for receiving fastening nuts and bolts as indicated by the arrows "F" in FIGS. 5, 6 and 10). In other embodiments, the vent 40 may include further apertures located closer to the rear 78 of the vent 40 to facilitate the outflow of water, e.g. when the vehicle with the canopy 52 and vent 40 is parked in a downhill orientation.

The second sheet 44 includes a flat top wall zone 72, extending substantially horizontally in use, and a slightly sloped rear wall zone 74 which extends nearly vertically in use. The zones 72 and 74, together with the end zones of the second sheet 44, essentially form a cap for the first sheet 42 and also partially define an external duct air flow path through the air vent 40. The second sheet 44 thus partially covers the first sheet 42.

Figure 10:
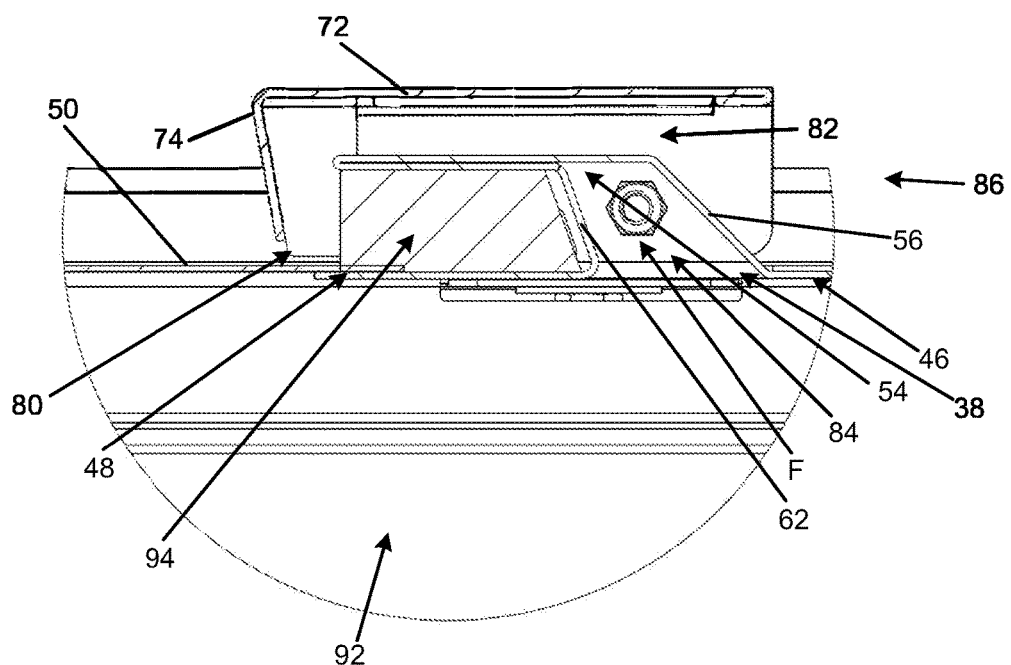
FIG. 10 is an enlarged view of the region "D" in FIG. 9.

Except for the end zones thereof which are secured together as described above, the first and second sheets 42, 44 are spaced apart so as to define an external duct 82 and an internal duct 84 when the sheets 42, 44 are assembled and installed in the canopy 52, as is best shown in FIGS. 6 and 10. The external duct 82 has an inlet 86 and an outlet 80. The rear wall zone 74 has rounded slots 76 arranged at opposite end regions of the vent 40 (see FIGS. 3 and 4). The slots 76 are essentially vertical extensions of the outlet 80 at the end regions, facilitate the flow of water through the outlet 80 in the event of rain.

Figure 7:
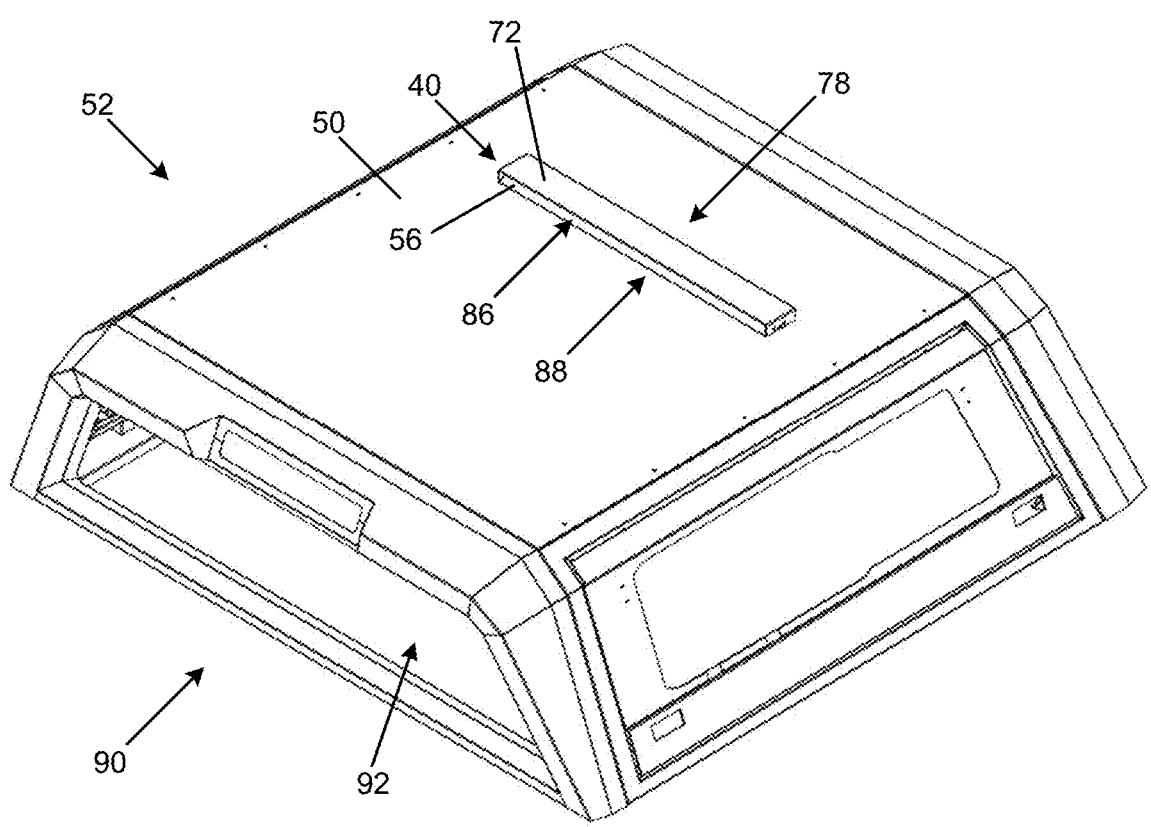
FIG. 7 is a three-dimensional view of an example of a canopy for a vehicle, with the embodiment of the air vent of FIG. 3 mounted thereto.
Figure 8:
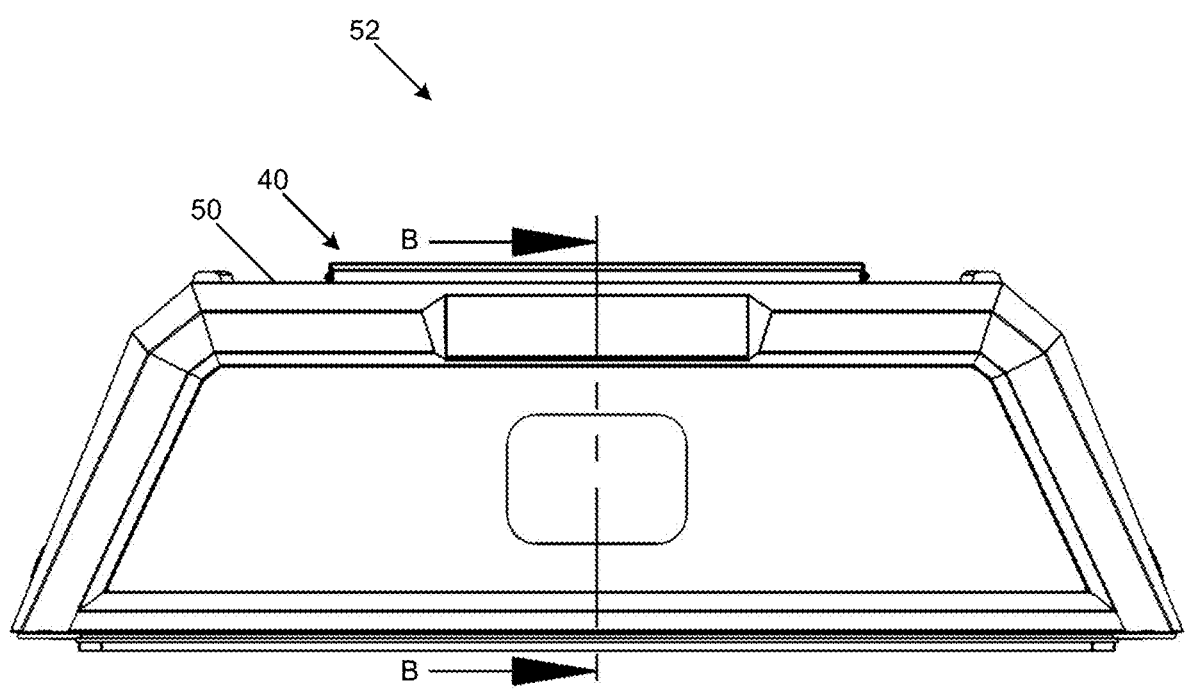
FIG. 8 is a rear view of the canopy and air vent of FIG. 7.
Figure 9:
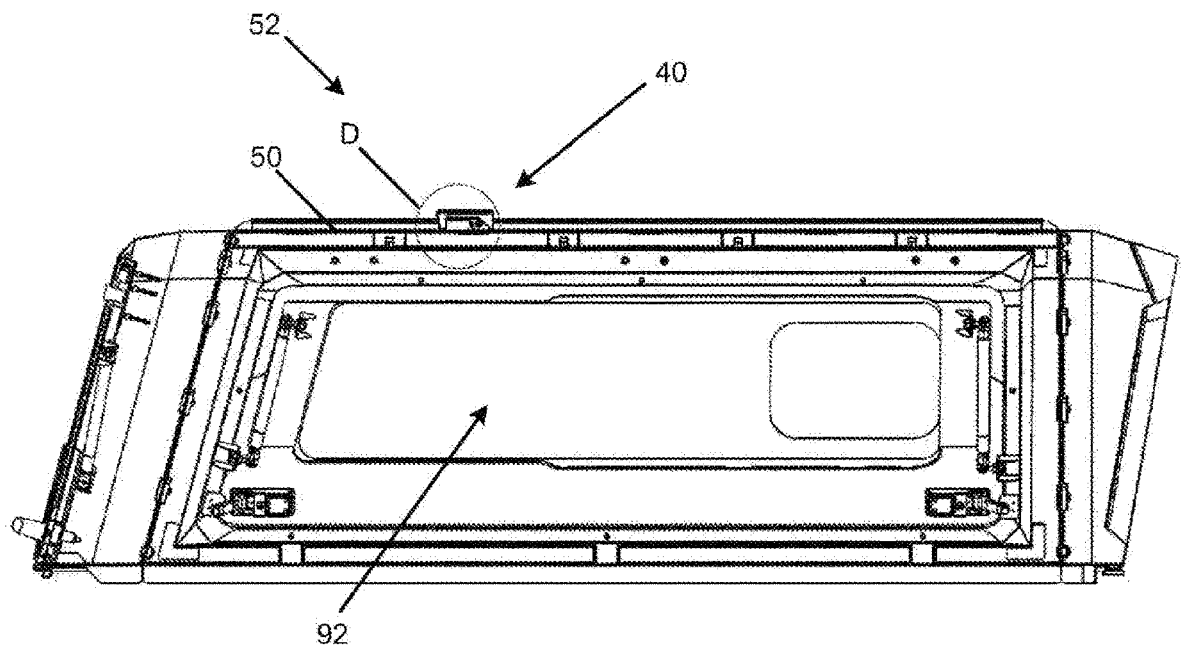
FIG. 9 is a cross-sectional view of the canopy and air vent of FIG. 8, taken along the line "B-B" in FIG. 8.

As is best shown in FIG. 7, in use, the inlet 86 is located at a front 88 of the vent 40 and is oriented to face the front 90 of the canopy 52, while the outlet 80 is located at the rear 78 of the vent 40. The vent 40 itself may be located in a rear area of the roof panel 50, or towards the rear thereof, extends along a width of the canopy 52, i.e. transverse to the length of the canopy 52.

As is evident from FIG. 7, the vent 40 has an elongate shape and extends across approximately three quarters of the width of the canopy 52. The vent 40 may, for instance, be between about 0.8 m and 1.2 m in length. It has been found that the elongate nature of the vent 40, and thus the fact that it may cover the majority of the width of the canopy 52, improves air flow and ventilation and reduces particle accumulation inside of the canopy 52.

The height of the outlet 80 is significantly less than the height of the inlet 86. The outlet 80 appears slit-like along the rear 78 of the vent 80 as opposed to the "taller" and/or "deeper" inlet 86 at the front 88 of the vent 40.

The outlet 80 and inlet 86 are arranged such that, in use, an uppermost point of the inlet 86 is located above an uppermost point of the outlet 80 (see FIGS. 6 and 10 and also refer to the earlier description with reference to FIG. 2).

The internal duct 84 is formed by the first sloped portion 56, the duct portion 58 and the second sloped portion 62 of the first sheet 42. The internal duct 84 is, at a first end, in fluid communication with the external duct 82 via the openings (not shown in FIGS. 3 to 10, but shown in FIG. 2) arranged on the second sloped portion 62. At a second end, the duct 84 is open and communicates with the canopy's interior, as is described in greater detail below.

The overhang portion zone 60 forms an overhang which shelters the one or more openings in the sloped portion 62, permitting ventilation of the interior 92 of the canopy and substantially preventing ingress of water through the openings.

As shown in FIG. 2, the openings of the internal duct are located in an upper zone of the second sloped portion (numeral 32 in FIG. 2) which may aid in preventing the ingress of water through the openings. Similar positioning may be employed in the embodiment of FIGS. 3 to 10. Furthermore, the height of the openings is greater than that of the outlet 80.

The openings providing fluid communication between the ducts 82, 84 are arranged such that, in use, the uppermost point of the outlet is located below the lowermost points of the openings. This is not shown in FIGS. 3 to 10 but is apparent from the positioning of the openings 30 and outlet 28 of FIG. 2.

Turning again to FIGS. 6 and 10, a filter arrangement or filter component 94 may be provided adjacent to the opening(s) substantially to prevent dust and/or water from entering the interior 92 of the canopy 52. Any suitable filter which allows air flow but substantially blocks water and dust may be selected.

In use, air from the external environment (and possibly also water, dust and/or other particles) flows over the canopy 52 and enters the vent 40 through the inlet 86. The air is funnelled upwards by the first sloped portion 56 and through the external duct 82 towards the rear wall zone 74 which causes the air to flow substantially downwards. Air flows into the interior 92 of the canopy 52 via the openings of the internal duct 84. Water and dust which manages to come close to the openings may be substantially filtered out by the filter arrangement 94, which is located upstream of the openings. Excess air flows out of the vent 40 via the outlet 80. In embodiments of the invention, the air vent may provide a positive pressure air ventilation system. The air vent may thus filter fresh air into the canopy or other enclosed space at a greater rate than the rate at which it is urged out of the enclosed space.

The Applicant believes that the air vent of embodiments of the invention may overcome at least some of the shortcomings of the prior art as identified above and may thus provide an air vent with enhanced performance. The air vent may substantially balance the pressure inside of the canopy or vehicle with that of the external environment while the vehicle is travelling, improving air flow and ventilation of the canopy while substantially preventing the inflow of dust and/or water into the canopy.

The configuration of the sheets, positioning of openings and/or elongate nature of the vent may improve air flow and ventilation.

The invention claimed is:

1. An air vent for a vehicle or vehicle canopy, the air vent comprising:
    an external duct having an inlet and an outlet, the height of the outlet being less than the height of the inlet, wherein the inlet and the outlet are arranged such that, in use, an uppermost point of the inlet is located above an uppermost point of the outlet;
    an internal duct in fluid communication with the external duct via one or more openings arranged in the internal duct or at a junction between the internal duct and the external duct, wherein the internal duct is configured to be in fluid communication with an interior of the vehicle or canopy via a slot defined by the vehicle or canopy, and wherein the one or more openings is arranged such that, in use, the uppermost point of the outlet of the external duct is located below a lowermost point of the one or more openings; and
    a first sheet of material and a second sheet of material which are secured or securable to each other, the first sheet defining an operatively lower part of the air vent and the second sheet defining an operatively upper part of the air vent, wherein the first sheet is shaped to include an overhang which defines part of the external duct and which operatively shelters or covers the one or more openings.

2. The air vent according to claim 1, which further comprises a filter component or filter arrangement adjacent to the one or more openings substantially to prevent dust and/or water from entering the interior of the vehicle or canopy.

3. The air vent according to claim 1, wherein the one or more openings has a height which is greater than the height of the outlet.

4. The air vent according to claim 1, wherein the internal duct has a first end and a second end, with the one or more openings being located at the first end and the second end being configured for fluid communication with the interior of the vehicle or canopy to allow air to flow into and/or out of the interior of the vehicle or canopy.

5. The air vent according to claim 1, wherein the one or more openings is a plurality of openings spaced apart along a length of the air vent.

6. The air vent according to claim 1, wherein the sheets are secured to each other at ends of the air vent, the sheets being shaped and arranged so as to define the external duct and the internal duct.

7. The air vent according to claim 1, wherein the one or more openings is/are located on an operatively upper zone of a sloped portion of the first sheet, the one or more openings being arranged such that, in use, the uppermost point of the outlet is located below a lowermost point of the one or more openings.

8. The air vent according to claim 1, which further comprises a filter component or filter arrangement adjacent to the one or more openings substantially to prevent dust and/or water from entering the interior of the vehicle or canopy, wherein the filter component or filter arrangement is located between the overhang and a substantially flat base zone of the first sheet.

9. The air vent according to claim 1, which has a generally elongate shape.

10. The air vent according to claim 9, wherein the inlet and the outlet are in the form of slits extending along the length of the air vent.

11. The air vent according to claim 10, wherein the inlet is configured to face a front of the vehicle or canopy and the outlet is configured to face a rear of the vehicle or canopy.

12. The air vent according to claim 9, which is configured to be mounted to the canopy and which is configured to extend along a lateral dimension of a roof of the canopy.

13. The air vent according to claim 12, which is shaped and dimensioned to extend across at least half the width of the roof of the canopy.

14. A vehicle canopy which includes or has mounted thereto an air vent according to claim 1.

15. The vehicle canopy according to claim 14, wherein the vehicle canopy is a modular canopy comprising side panels, front and/or rear panels, and a roof panel, and wherein the air vent is attached to the roof panel, the roof panel being manufactured with the slot therein to provide fluid communication between the interior of the canopy and the internal duct of the air vent.

16. The vehicle canopy according to claim 15, wherein the air vent is operatively located in or near a rear zone of the roof panel.

17. A kit for a vehicle canopy having at least two components wherein one component is an air vent according to claim 1.

18. The kit according to claim 17, which comprises side panels, front and/or rear panels, and a roof panel, and wherein the air vent is attached or attachable to the roof panel, the roof panel being manufactured with the slot therein to provide fluid communication between the interior of the canopy and the internal duct of the air vent.

19. An air vent for a vehicle or vehicle canopy, the air vent comprising:
    an external duct having an inlet and an outlet, the height of the outlet being less than the height of the inlet, wherein the inlet and the outlet are arranged such that, in use, an uppermost point of the inlet is located above an uppermost point of the outlet;
    an internal duct in fluid communication with the external duct via one or more openings arranged in the internal duct or at a junction between the internal duct and the external duct, wherein the internal duct is configured to be in fluid communication with an interior of the vehicle or canopy via a slot defined by the vehicle or canopy, and wherein the one or more openings is arranged such that, in use, the uppermost point of the outlet of the external duct is located below a lowermost point of the one or more openings; and a first sheet of material and a second sheet of material which are secured or securable to each other, the first sheet defining an operatively lower part of the air vent and the second sheet defining an operatively upper part of the air vent, wherein the sheets are secured to each other at ends of the air vent, the sheets being shaped and arranged so as to define the external duct and the internal duct.

20. A vehicle canopy which includes or has mounted thereto an air vent comprising:

an external duct having an inlet and an outlet, the height of the outlet being less than the height of the inlet, wherein the inlet and the outlet are arranged such that, in use, an uppermost point of the inlet is located above an uppermost point of the outlet;

an internal duct in fluid communication with the external duct via one or more openings arranged in the internal duct or at a junction between the internal duct and the external duct, wherein the internal duct is configured to be in fluid communication with an interior of the vehicle or canopy via a slot defined by the vehicle or canopy, and wherein the one or more openings is arranged such that, in use, the uppermost point of the outlet of the external duct is located below a lowermost point of the one or more openings; and wherein the vehicle canopy is a modular canopy comprising side panels, front and/or rear panels, and a roof panel, and wherein the air vent is attached to the roof panel, the roof panel being manufactured with the slot therein to provide fluid communication between the interior of the canopy and the internal duct of the air vent.

21. The air vent according to claim 20, which further comprises a filter component or filter arrangement adjacent to the one or more openings substantially to prevent dust and/or water from entering the interior of the vehicle or canopy.

22. The air vent according to claim 20, wherein the one or more openings has a height which is greater than the height of the outlet.

23. The air vent according to claim 20, wherein the internal duct has a first end and a second end, with the one or more openings being located at the first end and the second end being configured for fluid communication with the interior of the vehicle or canopy to allow air to flow into and/or out of the interior of the vehicle or canopy.

24. The air vent according to claim 20, wherein the one or more openings is a plurality of openings spaced apart along a length of the air vent.

25. The air vent according to claim 20, wherein the sheets are secured to each other at ends of the air vent, the sheets being shaped and arranged so as to define the external duct and the internal duct.

26. The air vent according to claim 20, wherein the one or more openings is located on an operatively upper zone of a sloped portion of the first sheet, the one or more openings being arranged such that, in use, the uppermost point of the outlet is located below a lowermost point of the one or more openings.

27. The air vent according to claim 20, which further comprises a filter component or filter arrangement adjacent to the one or more openings substantially to prevent dust and/or water from entering the interior of the vehicle or canopy, wherein the filter component or filter arrangement is located between the overhang and a substantially flat base zone of the first sheet.

28. The air vent according to claim 20, which has a generally elongate shape.

29. The air vent according to claim 28, wherein the inlet and the outlet are in the form of slits extending along the length of the air vent.

30. The air vent according to claim 29, wherein the inlet is configured to face a front of the vehicle or canopy and the outlet is configured to face a rear of the vehicle or canopy.

31. The air vent according to claim 28, which is configured to be mounted to the canopy and which is configured to extend along a lateral dimension of a roof of the canopy.

32. The air vent according to claim 31, which is shaped and dimensioned to extend across at least half the width of the roof of the canopy.

33. The vehicle canopy according to claim 20, wherein the air vent is operatively located in or near a rear zone of the roof panel.

34. A kit for a vehicle canopy having at least two components wherein one component is an air vent according to claim 20.

35. The kit according to claim 34, which comprises side panels, front and/or rear panels, and a roof panel, and wherein the air vent is attached or attachable to the roof panel, the roof panel being manufactured with the slot therein to provide fluid communication between the interior of the canopy and the internal duct of the air vent.

* * * * *